United States Patent Office 3,210,308
Patented Oct. 5, 1965

3,210,308
POLYMERIC FLOCCULANTS
David C. Garms, Lake Jackson, and Floyd E. Norton, Brazoria, Tex., assignors to The Dow Chemical Company, Midland, Mich., a corporation of Delaware
No Drawing. Filed July 6, 1962, Ser. No. 208,117
13 Claims. (Cl. 260—29.2)

This invention relates to polymeric compositions having valuable utility as flocculants. More specifically, the invention concerns improved methods for the preparation of (1) polyalkylenimines and (2) polymeric condensates of polyalkylenepolyamines and vicinal dihaloalkanes, whereby highly flocculent-active polymers are obtained.

Although polyalkylenimines and polymeric condensates of polyalkylenepolyamines and vicinal dihaloalkanes are well known, the prior art methods of their preparation have not satisfactorily solved the problems of producing a water-soluble polymer product which possesses exceptional flocculating ability. Furthermore, previously known methods for preparing water-soluble polymers of this type have been limited to production of polymer solutions having relatively high viscosities and low weight percentages of solids. Due to the fact that low viscosity solutions are most easily handled, and since higher weight percentages of solids permit lower total volumes, and consequently increased economy, in production and transport of a given quantity of polymer, it would be advantageous to provide a method for preparing flocculent-active, water-soluble polyalkylenimines and polymeric condensates of polyalkylenepolyamines and dihaloalkanes as low viscosity solutions of high polymer contents. It would be especially desirable to combine these advantages in a method yielding a polymer product possessing superior flocculating activity.

It is, accordingly, a principal object of the present invention to provide a process for the preparation of water-soluble polymeric alkylenimines and polymeric condensates of polyalkylenepolyamines and vicinal dihaloalkanes whereby extremely flocculent-active polymers are obtained in the form of low viscosity solutions containing high weight percentages of polymer. Other objects and advantages of the present invention will become apparent from the following description.

It has now been discovered, in accordance with the present invention, that surprisingly high flocculent-active polyalkylenimines and polymeric condensates of polyalkylenepolyamines and vicinal dihaloalkanes can be prepared in the form of low viscosity solutions containing high weight percentages of polymer. The polyalkylenimines are prepared by polymerization of alkylenimine monomers which contain from one to four carbon atoms. The polymeric condensates are prepared from the condensation reaction of polyalkylenepolyamines having a minimum molecular weight of about 400 (which are prepared by the step-wise reaction of a polyalkylenepolyamine, such as ethylenediamine, diethylenetriamine, triethylenetetramine, etc., with a dihaloalkane such as ethylene dichloride, ethylene dibromide, etc.) and vicinal dihaloalkanes which contain from 2 to about 6 carbon atoms.

The general method of preparing the polyalkyleneimines comprises: (1) mixing together an alkylenimine, a vicinal dihaloalkane, an alkali metal salt and a solvent; (2) heating the continuously stirred mixture to accelerate polymerization of the alkylenimine monomer; and (3) subjecting the reaction mixture to a shearing force during the polymerization reaction period.

Similarly, the general method of preparing polymeric condensates of polyalkylenepolyamines and vicinal dihaloalkanes possessing the previously enumerated desired characteristics, comprises the steps of (1) mixing together a solution of a polyalkylenepolyamine, having a molecular weight of at least about 400, a vicinal dihaloalkane and an alkali metal salt; (2) heating the continuously stirred mixture; and (3) subjecting the reaction mixture to a shearing force during the condensation-polymerization reaction period.

In the above general methods, the solvent employed is water, a water-soluble alcohol or a mixture thereof. The vicinal dihaloalkane contains from 2 to about 6 carbon atoms and the halogen substituents are bromine, chlorine or a combination thereof. In the preparation of polyalkylenimines the dihaloalkane is employed as an initiator in an amount equal to about 2.5 to 4.5 weight percent of the alkylenimine. In the preparation of polymeric condensates the dihaloalkane is employed as a reactant in an amount equal to about 15 to 25 weight percent of the polyalkylenepolyamine starting material. The alkali metal salt is selected from the sodium, potassium and lithium salts of carboxylic acids having from 1 to 6 carbon atoms (e.g., formic, acetic, propionic, butyric, oxalic and citric acids) and of mineral acids (e.g., hydrochloric, hydrobromic, sulfuric, phosphoric and nitric acids). The salt is employed in an amount such that the reaction solvent contains from about 1 to 20 weight percent of the salt with a concentration of from about 5 to 10 weight percent preferred.

The temperature utilized may extend over a range from about 20° to about 140° C. with a range of 70° to about 90° C. preferred. While the pressure may range from atmospheric up to 75 lbs. per in.$^2$ and even higher, the reaction is preferably run at autogenous pressure.

The reaction mixture may be subjected to a shearing force by a variety of methods. In a preferred method the reaction mixture is simply cycled from a bottom outlet in the reaction vessel through an externally located shearing apparatus, such as a gear pump, and then back into the top of the reaction vessel. The apparatus employed to accomplish shearing may be any one of a variety of types which produce sufficient shear stress on the reacting mixture to reduce the size of the largest polymer molecules being formed. The shearing action is generally carried out by continual cycling of the reaction mixture until sampling of the contents indicates substantial completion of the reaction as determined by viscosity measurements. The length of time of one complete cycle will normally be from about 8 to 12 minutes. It should be noted that shearing during the polymerization process is necessary for achieving the desired flocculent activity. Examples of other types of shearing devices suitable are centrifugal pumps, eccentric gear pumps, cam type pumps, piston pumps in sequence with a homogenizing valve, and the like.

The procedures for preparing the polymeric compositions of this invention will be more specifically described below with separate consideration of the polyalkylenimines and the polymeric condensates of polyalkylenepolyamines and dihaloalkanes.

The flocculation rates reported in the examples to follow were measured by preparing aqueous solutions of the polymeric products at a concentration of 0.05 weight percent polymer, and introducing 0.7 ml. thereof into a 100 ml. graduated cylinder containing 5 grams of arrowroot starch dispersed in 100 ml. of water. The starch solution was prepared by frequent shaking of the cylinder over a 30 min. period after which the 0.7 ml. of flocculating agent solution was introduced in three separate portions and the cylinder gently inverted three times after each addition. After the final addition and inversion, the flocculating rate was determined by observing the movement of the interface formed by the flocs and the overhead. This settling rate is reported in inches per minute.

The reported viscosities in all examples refer to those of aqueous polymeric product solutions, containing one per cent by weight of polymer, measured by use of a modified Ostwald viscometer, at a temperature of 100° F.

ALKYLENIMINES

A solution containing from about 20 to 60 weight percent of alkylenimine monomer is employed as a starting material in the preparation of polyalkylenimines in accordance with this invention. A preferred concentration range is 30 to 45 weight percent. Examples of suitable alkylenimine monomers are ethylenimine, propylenimine, 1,2-butylenimine, 2,3-butylenimine and isobutylenimine. The following examples describe completely representative specific embodiments of this aspect of the present invention. These examples are not to be interpreted as limiting the invention other than as defined in the claims.

Example 1

A quantity of 27 pounds of water, 2.7 pounds of sodium chloride, and 200 mls. of ethylene dichloride was placed in a reaction vessel equipped with means for stirring and temperature control. The reaction vessel was also equipped with a bottom outlet line running through a gear pump and back into the top of the reaction vessel. The temperature of the reaction vessel was gradually raised to 80° C. and maintained thereat while 13 pounds of ethylenimine was passed into the reaction mixture over a two hour period. Following addition of the ethylenimine, a shearing process was begun by continuously passing the contents of the reaction vessel through the externally located gear pump and subsequently back into the vessel. A complete cycle of the vessel contents occurred approximately every 10 minutes. This recycling, shearing, and heating, was continued for a period of approximately four hours during which time the reaction vessel contents were continuously stirred. Completion of the reaction was determined by viscosity measurements of samples which gradually increased to a maximum value. The final product had a 1 percent viscosity of 2.13 centistokes (hereafter cs.), a solids content of 33 weight percent, and a measured flocculation rate of 13.0 inches per minute.

Example 2

The procedure of Example 1 was employed to obtain the following comparative data. All conditions and concentrations were the same with the exception noted in Table I below.

TABLE I

| Technique | Viscosity, cs. | Flocculation Rate, in./min. |
|---|---|---|
| Salt+shear | 2.13 | 13.0 |
| Shear only | 4.26 | 12.0 |
| Salt only | 1.37 | 5.7 |
| No salt or shear | 2.35 | 5.5 |

Example 3

A quantity of 21.38 pounds of water, 1.34 pounds of sodium chloride, and 170 mls. of ethylene dichloride were introduced into a reaction vessel as in Example 1. The shearing was accomplished by locating a gear pump external to the reaction vessel and connecting it thereto with an outlet and inlet line. The sodium chloride in this particular example was obtained as a 24 weight percent Stratton Ridge brine solution and diluted with the water used as a solvent to give a salt concentration of 5 weight percent. The temperature was raised to 80° C. and maintained thereat while 13 pounds of ethylenimine were passed into the reaction mixture over a two hour period. Shortly after the ethylenimine was introduced the shearing action was started by passing the reaction mixture from the vessel through the pump and back into the vessel, with a complete cycle of the vessel contents requiring approximately 8 minutes. This temperature and cycling were continued for approximately 4 hours until substantial completion of the reaction as determined by a peak value of viscosity measurements on periodically withdrawn samples. The final aqueous polymer solution contained 33 weight percent solids, had a 1 percent viscosity of 2.1 cs. and a flocculation rate of 10.5 inches per minute.

Example 4

In accordance with the method and procedure of Example 1 a quantity of 15.8 pounds of water, 2.8 pounds of sodium chloride, and 180 mls. of ethylene dichloride where employed to obtain a polyethylenimine solution. The sodium chloride was obtained as a 24 weight percent Stratton Ridge brine solution and diluted with the water used as a solvent to give a concentration of 10 percent. The temperature was raised to 80° C. and 13 pounds of ethylenimine was added over a two hour period. Shearing was started after the ethylenimine addition with 12 minutes required for a complete cycle of the vessel contents through an externally located gear pump. Completion of the reaction as determined by viscosity measurements occurred in approximately four hours during which time the contents of the vessel were continuously passed through the pump. The polymer product solution thus produced analyzed as follows:

Percent solids _____ 33
Viscosity _____cs__ 1.85
Flocculation _____in./min__ 12

Example 5

The procedure of Example 4 was followed with the following exceptions. A quantity of 23 pounds of water, 1.44 pounds of sodium chloride, 170 mls. of ethylene dichloride, and 7 pounds of ethylenimine was employed. Complete cycling of the vessel contents through an externally located gear pump, to accomplish shearing, took approximately 10 minutes. After four hours, completion of the reaction was indicated by a maximum in viscosity measurements. The product thus produced analyzed as follows:

Percent solids _____ 20
Viscosity _____cs__ 2.6
Flocculation rate _____in./min__ 11.5

Example 6

The procedure of Example 4 was followed with the following exceptions. A quantity of 27 pounds of water, 2.8 pounds of sodium sulfate, 290 mls. of ethylene dichloride and 13 pounds of ethylenimine was employed. Complete cycling of the vessels contents through an externally located gear pump took approximately 10 minutes. Completion of the reaction was indicated, by viscosity measurements, after approximately four hours. Shearing was maintained throughout the reaction period. The product analysis was:

Percent solids _____ 33
Viscosity _____cs__ 2.06
Flocculation rate _____in./min__ 12.52

Example 7

As in the previous examples, a reaction vessel was charged with 24.4 pounds of water, 1.3 pounds of sodium acetate, 170 mls. of ethylene dichloride and 15.8 pounds of ethylenimine. The procedure of Example 1 was followed and yielded a polymer solution product having 40 weight percent solids, a 1 percent viscosity of 2.56 cs. and a flocculation rate of 10.02 in./min.

Example 8

The procedure of Example 1 was followed with the exceptions noted. A quantity of 24.2 lbs. of water, 1.30 lbs. of potassium bromide, 150 ml. of ethylene dibromide, and 7.75 lbs. of ethylenimine was employed. The polymer product solution contained 25 weight percent solids and had a 1 percent viscosity of 2.38 cs. The flocculation rate was 11.5 in./min.

Example 9

A quantity of 400 ml. of water, 20 gm. of $CaCl_2$, and 5 ml. of ethylene dichloride were placed in a reaction vessel equipped with means for stirring and temperature control. The temperature of the reaction vessel was raised to 80° C. and maintained thereat while 240 ml. of ethylenimine was added. Following the addition of the ethylenimine, the reaction was allowed to continue for 4 hours at which time the viscosity had increased to a constant maximum value. The final product had a 1 percent viscosity of 2.24 cs., a solids content of 33 weight percent, and a measured flocculation rate of 6.25 in./min.

POLYALKYLENEPOLYAMINES

The molecular weight and concentration of the polyalkylenepolyamine starting material are important factors in this procedure and must meet certain specifications. The molecular weight must be a minimum of about 400 and this starting material may be prepared by the condensation reaction of a polyalkylenepolyamine, such as ethylenediamine, diethylenetriamine or triethylenetetramine, and a vicinal dihaloalkane, such as ethylene dichloride or ethylene dibromide. The concentration of the solution of polyalkylenepolyamine starting material, having a molecular weight of about 400, may be in the range of from about 20 to 60 weight percent with a concentration of from 30 to 45 weight percent preferred. The following detailed procedure (Procedure A) illustrates a representative method for preparing a suitable polyalkylenepolyamine starting material. This procedure features a step-wise condensation reaction between triethylenetetramine and ethylene dichloride yielding a polyethylenepolyamine product having a molecular weight of about 400. This product was employed in Examples 10 to 18, below.

PROCEDURE A

Streams of (1) a 50 weight percent aqueous solution of triethylenetetramine, at a rate of 1.3 gal./min. and (2) ethylene dichloride, at a rate of 0.37 gal./min. were fed to a mixing nozzle and the resulting mixture was fed as a 1.67 gal./min. stream into a continuous coil reactor with a holdup time of 20 min. The exit stream of 1.67 gal./min. and an ethylene dichloride stream of 0.37 gal./min. were fed to a second mixing nozzle and the resulting stream, 2.04 gal./min., was channeled to a soaking tank with a holdup time of approximately 31 min. The exit stream of 2.04 gal./min. was passed into a flash tank where a portion of the water and unreacted ethylene dichloride (less than about 0.05 gal./min.) were flashed off. A 1.5 gal./min. exit stream of the remaining contents and a 50 weight percent aqueous sodium hydroxide stream flowing at a rate of 5 to 6 gal./min. were confluently directed into a mixing pump and the ensuing 6.5 to 7.5 gal./min. mixture was fed to a phase separator maintained at a temperature of about 130° to 150° C. Spent caustic solution, containing sodium chloride, was removed from the bottom and the desired product was removed from the top of the phase separator as an approximately 94 weight percent polyethylenepolyamine aqueous solution. The temperature of the coil reactor was maintained at about 150° to 170° C. and the temperature of the soak tank was maintained at about 150° to 200° C. The polyethylenepolyamine product so made had a molecular weight of about 400 and was reacted, as detailed in the examples below, to yield a polymeric condensate having the desired characteristics.

The following examples describe completely representative specific embodiments of this aspect of the present invention. These examples are not to be interpreted as limiting the invention other than as defined in the claims.

Example 10

A quantity of 15 lbs. of polyethylenepolyamine, having a molecular weight of about 400, prepared by the method of Procedure A, above, was placed in a reaction vessel equipped with stirring and temperature control means. The reaction vessel contained a bottom outlet line which was adapted to carry the vessel contents through an externally located gear pump and then back into the top of the reaction vessel. A quantity of 2 lbs. of sodium chloride, 36.5 lbs. of water and 950 ml. of ethylene dichloride was added to the reaction vessel containing the polyethylenepolyamine. The sodium chloride was obtained as a 24 weight percent Stratton Ridge brine solution and diluted with the water used as solvent, above, to give a concentration of approximately 5 weight percent. The temperature was raised to 100° C. and upon reaching that temperature, a shearing force was applied by passing the reaction mixture through the bottom outlet to the gear pump and subsequently back into the vessel. A complete cycle of the vessel contents took approximately 10 minutes. This cyclization and temperature were maintained for approximately four hours until the reaction was completed as determined by a maximum in viscosity measurements made on samples diluted to 1 percent solids which were taken periodically from the reaction mixture. The final product thus produced was in the form of an aqueous polymer solution, containing 31 weight percent polymer having a 1 percent viscosity of 2.33 centistokes and a flocculation rate of 11.6 in./min.

Example 11

The procedure of Example 10 was employed in order to demonstrate the effects of shearing and inclusion of salt in the method of this invention. All conditions and amounts are identical with those of Example 10 with the exception of those noted in the following tabulation.

| Technique | 1% Viscosity, cs. | Flocculation Rate, in./min. |
|---|---|---|
| Salt and shear | 2.33 | 11.6 |
| Shear only | 3.19 | 11.9 |
| Salt only | 1.72 | 6.6 |
| No salt or shear | 2.31 | 6.8 |

Example 12

The procedure of Example 10 was followed with the exception that 980 ml. of ethylene dichloride was employed. Analysis of the final aqueous product solution showed 31 weight percent polymer having a 1 percent viscosity of 2.22 cs. and a flocculation rate of 10.2 in./min.

Example 13

The procedure of Example 10 was followed with the exceptions that 3 lbs. of sodium chloride, 35.5 lbs. of water and 910 ml. of ethylene dichloride were used. The final aqueous polymer solution contained 30 weight percent solids, had a 1 percent solids viscosity of 1.95 cs. and a flocculation rate of 9.0 in./min.

Example 14

The procedure of Example 10 was followed with the exceptions that 30 lbs. of polyethylenepolyamine, having a molecular weight of about 400, 4.5 lbs. of ethylene dichloride, 9.5 lbs. of Stratton Ridge brine solution and 36 lbs. of water were employed. The product contained 30 weight percent solids, had a 1 percent viscosity of 1.71 cs. and a flocculation rate of 6.49 in./min.

Example 15

The procedure of Example 10 was followed with the exception that 30 lbs. of polyethylenepolyamine, 4.5 lbs.

of ethylene dichloride, 6.5 lbs. of Stratton Ridge brine solution and 21.5 lbs. of water were employed. The product contained 50 weight percent solids, had a 1 percent viscosity of 1.85 cs. and a flocculation rate of 7.0 in./min.

*Example 16*

The procedure of Example 10 was followed with the exception that 20 lbs. of polyethylenepolyamine, 1250 gm. of ethylene dichloride, 7.75 lbs. of Stratton Ridge brine and 7.25 lbs. of water were employed. The product contained 61 weight percent solids, had a viscosity of 1.46 cs. and had a flocculation rate of 6.1 in./min.

*Example 17*

The procedure of Example 10 was followed with the exception that 3.25 lbs. of ethylene dichloride, 3.4 lbs. of KBr and 54 lbs. of water were employed. The product contained 22 weight percent solids, had a 1 percent viscosity of 2.13 cs. and had a flocculation rate of 6.6 in./min.

*Example 18*

It was found that the procedure of Example 10 could be modified by eliminating the application of shear stress in order to rapidly determine the utility of the various salts in the process of this invention, i.e. Although shearing during polymerization is necessary to produce the desired high flocculent activity, it is not necessary to evaluate the effectiveness of the alkali metal salt. This modified procedure of Example 10 was used to obtain the following data:

|  | Na$_2$SO$_4$ | Blank | Na$_3$PO$_4$ | Na Citrate |
|---|---|---|---|---|
| Salt _____ gm__ | 28.15 | _____ | 28.15 | 28.15 |
| Ethylenimine _____ gm__ | 200 | 200 | 200 | 200 |
| Water _____ ml__ | 535 | 535 | 535 | 535 |
| Ethylene dichloride __ ml__ | 30 | 30 | 30 | 30 |
| Reaction time _____ hrs__ | 4 | 4 | 4 | 4 |
| Solids _____ percent__ | 30 | 30 | 30 | 30 |
| 1% viscosity _____ cs__ | 1.2 | 3.06 | 1.17 | 1.1 |

The foregoing examples illustrate the importance of employing an alkali metal salt and subjecting the reaction mixture to a shearing force during polymerization when an alkylenimine or a polyalkylenepolyamine is employed for purposes of preparing a polymeric composition having a high degree of flocculent activity. Although shearing force alone will beneficially increase the flocculent activity the problems of solubility, viscosity and solids content are not solved. Similarly, the presence of an alkali metal salt reduces viscosity of the polymeric product, but by itself does not increase flocculating ability of the polymer. By combining the addition of an alkali metal salt and subjecting the reaction mixture to shearing forces a water-soluble, low viscosity, high solids content polymeric product is prepared, as shown by the previous examples, which is as much as twice as effective as a conventionally prepared polyalkylenimine or polymeric condensate of a polyalkylenepolyamine and a dihaloalkane. It should also be noted that these improved results cannot be obtained by a post-polymerization shear treatment of a polymer product prepared in a salt solution. Variations of the basic method taught herein may be employed without departing from the scope of the invention, e.g., intermittent shearing, etc.

We claim:
1. A method for preparing a high molecular weight water-soluble polymer of the class consisting of polyalkylenimines and polyalkylenepolyamines which comprises:
    (1) mixing together
        (a) a solution containing from about 20 to 60 weight percent of a solute member of the group consisting of alkylenimines and polyalkylenepolyamines, said alkylenimine being selected from the group consisting of ethylenimine, propylenimine, isobutylenimine, 1,2-butylenimine and 2,3-butylenimine, said polyalkylenepolyamine having a minimum molecular weight of at least about 400, said solution containing from about 80 to 40 weight percent of a solvent member selected from the group consisting of water, water-soluble alcohols, and mixtures thereof, and
        (b) a vicinal dihaloalkane in an amount from about 2.5 to 4.5 weight percent of alkylenimine employed and from about 15 percent to 25 percent by weight of polyalkylenepolyamine employed; and
    (2) maintaining the temperature of the mixture at from about 20° to 140° C. for a period of time sufficient to yield a high molecular weight, water-soluble polymeric product having valuable utility as a flocculent; and
    (3) subjecting said mixture to a shearing force during the formation of said polymer.
2. The method of claim 1 wherein an alkali metal salt in an amount up to 20 weight percent of solvent employed is added to the reaction mixture.
3. The method of claim 1 wherein the solution contains from about 30 to 45 weight percent of the solute member.
4. The method of claim 1 wherein the vicinal dihaloalkane contains from 2 to 6 carbon atoms, inclusive, and the halogen atoms are selected from the group consisting of chlorine, bromine and mixtures thereof.
5. The method of claim 2 wherein the alkali metal salt is employed in an amount from about 5 to 10 weight percent of the solvent employed.
6. The method of claim 2 wherein the alkali metal salt is selected from the sodium, potassium and lithium salts of the group consisting of carboxylic acids having from 1 to 6 carbon atoms and mineral acids.
7. The method of claim 1 wherein the temperature of the mixture is maintained at from about 70° to 90° C.
8. The method of claim 1 wherein the solute is an alkylenimine of the group consisting of ethylenimine, propolyenimine, isobutylenimine, 1,2-butylenimine and 2,3-butylenimine.
9. A method for preparing a water-soluble high molecular weight polyethylenimine which comprises:
    (1) mixing together at a temperature of about 70° to 90° C.
        (a) an aqueous solution containing from about 30 to 45 weight percent of ethylenimine,
        (b) a vicinal dihaloalkane in an amount from about 2.5 to 4.5 weight percent of said ethylenimine and
        (c) an alkali metal salt in an amount from about 1 to 20 weight percent of aqueous solvent and
    (2) subjecting said mixture to a shearing force during the formation of polyethylenimine.
10. A method for preparing a high molecular weight, water-soluble polymeric condensate of a polyalkylenepolyamine and a vicinal dihaloalkane which comprises:
    (1) reacting by heating together at about 70° to 100° C.
        (a) an aqueous solution containing about 30 to 45 weight percent of a polyalkylenepolyamine having a molecular weight of at least about 400,
        (b) a vicinal dihaloalkane in an amount from about 15 to 25 weight percent of said polyalkylenepolyamine,
        (c) an alkali metal salt in an amount from about 1 to 20 weight percent of aqueous solvent present, and
    (2) subjecting said mixture to a shearing force during the formation of siad polymeric condensate.
11. The product of the process of claim 1.

12. The product of the process of claim 9.
13. The product of the process of claim 10.

References Cited by the Examiner
UNITED STATES PATENTS

| | | | |
|---|---|---|---|
| 2,182,306 | 12/39 | Ulrich et al. | 260—2 |
| 2,765,229 | 10/56 | McLaughlin | 260—2 |
| 2,834,675 | 5/58 | Jen et al. | 260—2 |
| 3,004,924 | 10/61 | Kirkpatrick et al. | 252—344 |

FOREIGN PATENTS 760,869  11/56  Great Britain.

MURRAY TILLMAN, *Primary Examiner.*

JOSEPH R. LIBERMAN, *Examiner.*